Jan. 1, 1929.
P. J. GROENENSTEIN
1,697,502
GLARE SHIELD
Filed Feb. 5, 1925
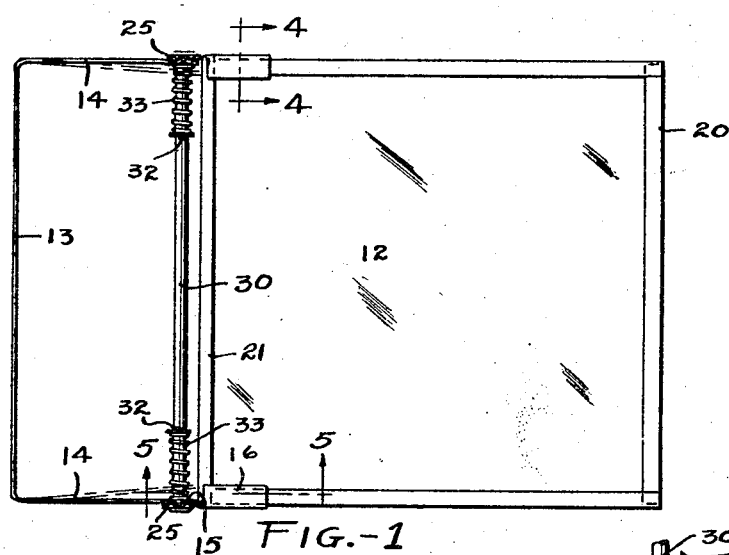
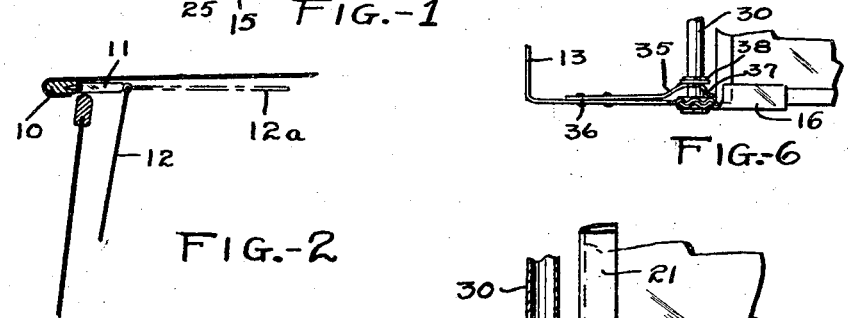
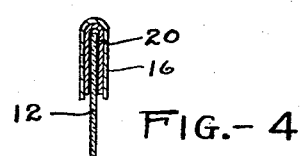
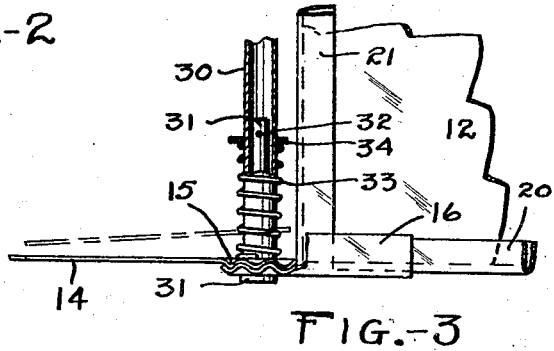
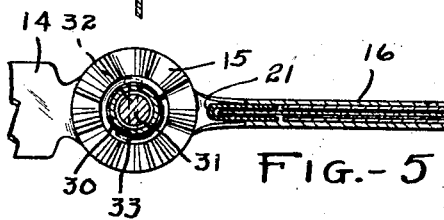
Inventor,
Philip J. Groenenstein,
By Bakis Macklin Goldrick & Tear,
Attorneys Patented Jan. 1, 1929.

1,697,502

UNITED STATES PATENT OFFICE.

PHILIP J. GROENENSTEIN, OF EAST CLEVELAND, OHIO.

GLARE SHIELD.

Application filed February 5, 1925. Serial No. 6,943.

The usual arrangement for glare shields for automobiles heretofore employed has been mounted upon the outer portion of the automobile in front of the windshield and frequently openings have been provided with means within the car for adjusting the shields to the desired position. This necessitates an opening adjacent the windshield for extending a control member within the car.

An object of the present invention is the provision of a glare shield which may be removably secured to a windshield frame inside the vehicle and may be readily attached for the purpose of shielding the eyes of the driver. In this connection my invention contemplates a glare shield having few operating parts which may be readily attached to a vehicle and quickly adjusted to the desired position.

A further object of my invention is the provision of a shield which may be readily removed from the supporting bracket without detaching the bracket from the vehicle.

The preferred form for carrying out my invention will hereinafter be set forth in the following description which pertains to the accompanying drawings wherein Fig. 1 is a plan view showing a shield made in accordance with my invention; Fig. 2 is a section through a portion of a motor vehicle adjacent the windshield and showing my invention adapted to the top frame; Fig. 3 is a section taken on an enlarged scale through a portion of the glare shield; Figs. 4 and 5 are sections taken on correspondingly numbered lines in Fig. 1 respectively and Fig. 6 is a plan view showing a portion of the windshield embodying a modified form of spring connection for use with my invention.

My invention as shown is adapted for attachment to either the windshield frame or to the frame of the vehicle top, and to this end I have shown a frame having a top at 10 which supports a bracket 11 inside the vehicle. The bracket supports the shield 12 in such manner that it may be adjusted to various positions as indicated by the lines 12 and 12ª respectively in Fig. 2. The bracket in the preferred form embodies a U-shaped one-piece member having a base 13 which is adapted to be attached to the vehicle frame and having arms 14, the ends of which are provided with teeth such as formed by radial corrugations 15. This characteristic may be formed by a stamping operation so as to make the teeth integral with the bracket in a simple and expeditious manner.

The shield is supported in a frame 20, in the preferred form, comprising any suitable material such as transparent colored celluloid which is slidably positioned within the frame. The end of the frame adjacent the bracket is also provided with teeth or currugations 25 which are shaped similar to and are arranged to engage with the teeth 15 of the bracket. In the preferred form the frame members comprise stampings which are supported by a clip 16 which engages the frame and is shown as rigidly mounted thereon. Before the device is assembled the plate 12 is slid into the frame and may be held in place by a frame member 21 which is slightly clamped by the clip 16 and is prevented from coming off by the corrugated end 15 of the bracket.

To maintain the bracket and the shield in operative position with reference to each other, I have shown a tube 30 which extends through the arms of the bracket and also through the corrugated members 25. A pin 31 may then extend into the tube from each end thereof and be held in position as by a cotter pin 32. If desired I may provide screws in place of the pins 31 which would have a threaded engagement with the tube 30. The head 33 of each pin 31 is arranged to engage the outer surface of the corrugated member 25, wherefore the bracket and shield may be readily held when in adjusted position.

To permit the shield to be adjusted by the driver, the bracket is so made that the arms 14 may be moved inwardly so as to permit the corrugations 25 to clear the corrugations 15. This may be readily effected merely by raising or lowering the shield manually and exerting sufficient pressure thereon to move the arms 14 which reference to the base 13. The arms in the embodiment shown are normally urged outwardly to insure engagement between the corrugations 15 and 25 by springs 33 which are disposed adjacent each end of the tube 30. In Fig. 3 a spring is illustrated as having one end thereof engaging the arm and as having the other end thereof engaging a washer 34 which is held in place by a cotter pin 32.

A modification of my invention is shown in Fig. 6 wherein the spring referred to in Fig. 3 is replaced by a leaf spring 35, one end of which is rigidly secured as at 36 to a bracket arm and the other end of which is curved as at 37 and is arranged to work against a washer 38 for urging the corrugations into engagement with each other.

One of the advantages of a glare shield made in accordance with my invention is the simplicity in construction as evidenced by the one-piece stamping which forms the bracket. A further advantage is the fact that the glare shield may be readily detached from the frame and replaced by another shield in the event of breakage.

While I have illustrated and described the supporting bracket as being a one-piece U-shaped member, I have found that in some instances it is advisable to merely use two arms which are not connected by an intermediate strip. This is desirable particularly on motor vehicles having a wind shield cleaner or a mirror mounted directly in front of the driver's position.

Having thus described my invention, I claim:

1. In a device of the character described, the combination with a pair of arms each having teeth associated therewith adjacent one end thereof, a shaft extending between and through the arms, a flexible shield, a frame extending around the marginal edges of the shield and having projecting portions which fit over the shaft, there being other teeth associated with the frame and arranged to mesh with the first mentioned teeth, the second named teeth being arranged to turn about the axis of the shaft with the frame, said arms being mounted at opposite ends of the frame, means associated with the shaft for normally urging the intermeshing teeth into engagement with each other, and other means carried by the shaft and positioned outside the frame and arms for holding the arms and frame in proper operating relationship on the shaft.

2. In a device of the character described the combination with a substantially U-shaped bracket, each arm of the bracket having teeth formed integrally therewith, a frame having teeth projecting therefrom and meshing with the first mentioned teeth, a shield slidably positioned within said frame, a single member extending between and through the arms of the bracket and providing a pivotal connection for said frame, said member being substantially equal to the length of the frame, the arms being yieldable to permit the teeth to be forcibly disengaged to permit the frame to be swung about said member as a pivot, and means associated with said member for acting on said arms to urge the teeth into engagement with each other.

3. In a device of the character described the combination with a support, of arms projecting therefrom, teeth formed integrally with said arms, a frame having teeth cooperating with the first mentioned teeth, a single member extending between the arms and through all of said teeth and providing a pivotal support for the frame, said member being substantially equal to the length of the frame, a glare shield slidably positioned within the frame, an abutment associated with said member adjacent each end thereof, springs engaging the abutments and also engaging some of said teeth for normally urging the teeth into engagement with each other, and said arms being yieldable with reference to the support for enabling the teeth on the frame to clear the teeth on the arms whereby the frame may be swung about the pivot and adjusted with reference to the support.

4. In a device of the character described, the combination with a pair of arms adapted to be attached to a support, of a transparent shield of flexible material, a frame embodying U-shaped members extending around the edges of the shield, the ends of one of the members extending into the U-shaped portion of another member and all of said members providing a guideway into which the shield may be slidably positioned, the frame having ears projecting therefrom and pivotally mounted at the ends thereof on the arms, there being intermeshing teeth associated with the arms and ears respectively, yieldable spaced means disposed between the arms for urging the teeth into engagement with each other, and other means disposed outside the arms for holding the frame in proper operating relationship with reference to the arms.

5. In a device of the character described, the combination with a pair of arms adapted to be attached to a support, a transparent shield, a frame embodying a plurality of interfitting U-shaped metallic strips extending around the marginal edges of the shield and functioning to permit the shield to be slidably positioned therein, said frame having projections extending beyond the shield, said arms being mounted at the ends of the shield and having teeth associated therewith, a shaft extending between the arms and teeth and also through the projecting portions of the frame, a second set of teeth associated with the frame and embracing the shaft and intermeshing with the first mentioned teeth, the second named teeth being arranged to turn about the shaft with the frame and with reference to the arms, said shaft having abutments thereon intermediate the arms, springs surrounding the shaft and engaging the abutments, said springs functioning to urge the intermeshing teeth into engagement with each other, and means outside the frame and attached to the shaft for holding the shaft in adjusted position with reference to the arms and for permitting the shield to be revolved about the axis of the shaft with reference to the arms.

In testimony whereof, I hereunto affix my signature.

PHILIP J. GROENENSTEIN.